No. 771,241.

Patented October 4, 1904.

UNITED STATES PATENT OFFICE.

WILLIAM AUGUSTUS HALL, OF BELLOWS FALLS, VERMONT.

PAINT COMPOSITION.

SPECIFICATION forming part of Letters Patent No. 771,241, dated October 4, 1904.

Application filed September 24, 1903. Serial No. 174,473. (No specimens.)

*To all whom it may concern:*

Be it known that I, WILLIAM AUGUSTUS HALL, a citizen of the United States, residing at Bellows Falls, in the county of Windham and State of Vermont, have invented or discovered certain new and useful Improvements in Paints or Paint Compositions, of which the following is a specification.

This invention or discovery relates to that class of water-paints now very largely in use, owing to their cheapness, and which are more or less waterproof or water-resisting, so as to withstand exposure to the weather; and the invention or discovery has for its object to improve the said class of paints by giving them a more elastic and more water-resisting character, so that they will be less inclined to crack and peel and will be more durable when exposed to the weather.

The water-paints heretofore largely in use have usually contained alkalized casein as a waterproof binder for the earthy or mineral bases composing the bodies of the paints, and although such paints present surfaces sufficiently hard and waterproof to withstand the action of the weather for a considerable time they are more or less inclined to crack and peel, owing to their hardness. I have discovered that by adding a suitable proportion of vegetable oil to the composition of the paints heretofore in use a certain amount of elasticity is imparted to the dried surfaces of the paints, and which obviates to a large extent the tendency to crack and peal and also increases the waterproof or water-resisting qualities of the paints. If, however, the vegetable oil be added to the water-paints heretofore largely in use and in which the casein is alkalized to render it soluble by means of lime, the product will in time deteriorate by the decomposition of the casein in contact with the lime.

Some attempts have heretofore been made to produce water-paint compositions suitable for use and containing certain proportions of oils; but so far as I am aware all of these attempts have been absolute failures, for the reason that when the oils of such compositions were saponified, so as to combine with the water of the composition, the addition to the saponified oil and water of an earthy or mineral base, such as whiting or talc, produced a light frothy product or paste entirely unsuitable for use as a paint, in that it would not spread properly to cover the surfaces to be painted. I have discovered, however, that if a binder containing a suitable proportion of a solution of a glutinous animal adhesive, as casein or animal glue, be combined with a mixture consisting of a powdered mineral or earthy base, as talc or whiting, a vegetable oil, and water the tendency of the composition to become frothy when the base is added to the oily composition is entirely prevented, and the character of the product is entirely changed, so that a paint-like composition which spreads readily is obtained. The binder or binding composition containing a solution of an animal adhesive, which I preferably use in my new paint composition, consists of about twenty parts of animal glue or casein, (preferably casein,) one part ammonia, one hundred and seventy parts water, two and one-half parts formaldehyde, two parts boracic acid, and one part creosote. If glue be used instead of casein, then no ammonia or other alkali is necessary. These stated proportions of the binder or binding composition may be varied somewhat, and the formaldehyde, boracic acid, and creosote may each or all be omitted, if desired, although it is better to use them. The formaldehyde has a waterproofing tendency and also a preservative effect, and the creosote acts as a preservative to prevent decomposition. The formaldehyde having an acid reaction also neutralizes the alkali, which acts as a solvent for the casein and produces a slightly-acid solution.

The new paint composition is formed by mixing about one hundred parts of the binding composition or solution just above described with about two hundred parts of what may be termed a "neutral" powdered mineral or earthy base, as whiting or talc, (preferably talc,) twenty-five parts of a vegetable oil, two parts potassium oxalate, and fifty parts of water, in a portion of which latter the potassium oxalate may have been previously dissolved. The vegetable oil which I preferably employ is Chinese tong-oil; but I find that good results may be secured by the use of other vegetable oils, such as linseed or cotton-seed oils.

In making the paint composition the binding composition or solution above described will first be well mixed with the talc or other neutral mineral base employed, and the Chinese tong or other vegetable oil will then be thoroughly mixed with the talc and binding composition before adding the dissolved potassium oxalate and water. The casein or other animal glutinous adhesive employed in the binder or binding composition will prevent frothing when the talc is combined with the oily composition, as hereinbefore stated.

An ammoniacal solution of casein does not produce a waterproof binder for a water-paint, even though it may contain a small percentage of formaldehyde, and where glue is used in place of the casein solution in the water-paint of course such paint would not be waterproof at all, and hence the waterproof action must come entirely from the vegetable oil employed in the paint composition, and the purpose of the adhesive or binding composition comprising the casein or animal glue is simply to prevent frothing and produce a paint which will spread or flow properly. Just what prevents the frothing of the mixture when the talc or other mineral base is added to a composition containing a binder comprising a suitable proportion of an animal adhesive I am unable to explain; but experiment has demonstrated that such animal adhesive does prevent the frothing, while vegetable adhesives—such as starch, gum, and dextrine—when used in the binding composition will not prevent the frothing, at least to any considerable extent. It will therefore be understood that the principal or novel feature of the present invention or discovery consists in the use of an animal adhesive in a binder or binding composition in the formation of a paint composition comprising a vegetable oil and a neutral mineral base.

The improved paint hereinbefore described is not waterproof when first applied to the surfaces painted even after it is first dried and can be readily washed off with water until it has been exposed to the air for two or three days, after which it becomes so oxidized as to be very weather-resisting and waterproof. Such weather-resisting or waterproof quality becomes gradually more pronounced with a continuation of the exposure of the dried paint to the air.

Having thus described my invention or discovery, I claim and desire to secure by Letters Patent—

1. A paint composition comprising about two hundred parts of a powdered neutral mineral base, as talc or whiting, five parts of a vegetable oil, fifty parts of water, and about one hundred parts of a binding composition comprising about twenty parts of an animal adhesive, and water, and which animal adhesive will combine with the oil, water and base to prevent frothing and enable the paint to flow or spread readily.

2. A paint composition comprising a powdered, neutral earthy or mineral base, as talc or whiting, a vegetable oil, water, and a binding composition comprising an ammoniacal solution of casein, and which binding composition will combine with the oil, water and base to prevent frothing and enable the paint to flow or spread readily.

3. A paint composition comprising a mineral base, a vegetable oil, a solution of casein, potassium oxalate and water.

4. A paint composition comprising a mineral base, a vegetable oil, a solution of casein, potassium oxalate, boracic acid, and water.

5. A paint composition comprising a mineral base, a vegetable oil, a solution of casein, potassium oxalate, boracic acid, formaldehyde, and water.

6. A paint composition comprising a mineral base, a vegetable oil, a solution of casein, potassium oxalate, boracic acid, creosote, and water.

7. A paint composition comprising a mineral base, a vegetable oil, a solution of casein, potassium oxalate, boracic acid, formaldehyde, creosote, and water.

8. A paint composition comprising talc, a vegetable oil, ammonia, casein, and water.

9. A paint composition comprising talc, Chinese tong-oil, an alkali, casein, and water.

10. A paint composition comprising talc, Chinese tong-oil, an alkali, casein, potassium oxalate, and water.

11. A paint composition comprising a mineral base, a vegetable oil, ammonia, casein, formaldehyde, and water.

12. A paint composition comprising a mineral base, a vegetable oil, ammonia, casein, boracic acid, formaldehyde and water.

13. A paint composition comprising a mineral base, a vegetable oil, ammonia, casein, boracic acid, formaldehyde, creosote, and water.

14. A paint composition comprising a mineral base, a vegetable oil, an alkali, casein, boracic acid, formaldehyde, creosote, potassium oxalate, and water.

In testimony whereof I affix my signature in presence of two witnesses.

WILLIAM AUGUSTUS HALL.

Witnesses:
FLORENCE J. WALSH,
HENRY CALVER.